United States Patent Office 3,287,465
Patented Nov. 22, 1966

3,287,465
CERTAIN 2-HETEROCYCLIC IMINOBENZ[c,d] INDOLE DYESTUFFS
Alfred Brack, Harald Gleinig, and Roderich Raue, Leverkusen, and Helmut Kleiner, Cologne-Stammheim, Germany, assignors to Farbenfabriken Bayer Aktiengesellschaft, Leverkusen, Germany, a corporation of Germany
No Drawing. Filed Mar. 13, 1964, Ser. No. 351,836
Claims priority, application Germany, Apr. 20, 1963, F 39,535
9 Claims. (Cl. 260—305)

The present invention relates to novel dyestuffs; more particularly it relates to sulphonic acid and carboxylic acid-group-free dyestuffs of the formula

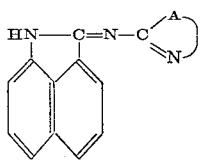

(I)

In this formula A means the residual constituent of a 5- or 6-membered heterocyclic nitrogen-containing ring system which may contain condensed aromatic rings. The new dyestuffs are obtained by condensing compounds of the formula (II)

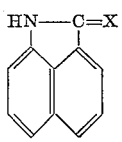

or

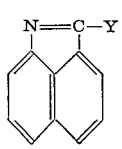

(III)

with amino compounds of the formula

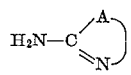

(IV)

and selecting the starting components in such a way that the dyestuffs obtained contain no sulphonic acid and carboxylic acid groups. In the Formulae II, III and IV respectively A means the residual constituent of a 5- or 6-membered heterocyclic nitrogen-containing ring system which may contain condensed aromatic rings, X denotes an atom capable of being split off or a group capable of being split off, for example an oxygen or sulphur atom, and Y likewise means an atom capable of being split off or a group capable of being split off, for example a thioether grouping; the aromatic and heterocyclic ring systems in the Formulae I to IV may, moreover, contain non-ionic substituents, such as for example halogen atoms such as chlorine, fluorine and bromine substituents, nitro, hydroxy and alkoxy groups, alkyl, cycloalkyl, aralkyl and aryl radicals, non-ionic derivatives of the carboxyl group such as carboxylic acid ester or carbonamide groups, furthermore sulphonyl groups and sulphonamide groups optionally further substituted by non-ionic radicals, such as alkylsulphonyl, arylsulphonyl groups, and acyl groups.

An expedient method of carrying out the process according to the invention consists in reacting a naphtholactam-(1,8) and a primary amine of Formula IV in an inert solvent with water-eliminating agents at a temperature between 20° C. and 160° C., preferably between 60° C. and 130° C. It is frequently advantageous to add an acid-binding agent, for example a tertiary amine such as pyridine. If the dyestuffs are obtained in the form of their salts, these can be converted in the usual manner into the underlying free bases of the general Formula I.

For carrying out the process according to the present invention, the following compounds of Formula II, are, for example, suitable:

Naphtholactam-(1,8),
4-chloronaphtholactam-(1,8),
2,4-dichloronaphtholactam-(1,8),
5-chloronaphtholactam-(1,8),
4-bromonaphtholactam-(1,8),
2,4-dibromonaphtholactam-(1,8),
4-nitronaphtholactam-(1,8),
2,4-dinitronaphtholactam-(1,8),
7-hydroxynaphtholactam-(1,8),
7-methoxynaphtholactam-(1,8),
4-ureidonaphtholactam-(1,8),
4-(methylureido)-naphtholactam-(1,8),
4-(phenylureido)-naphtholactam-(1,8),
4-(methylsulphonyl)-aminonaphtholactam-(1,8) and
4-(4'-methylphenylsulphonyl)-amino-naphtholactam-(1,8)

and other non-ionic substitution products.

Suitable primary amines of Formula IV are, for example:

2-aminobenzothiazole-(1,3),
2-amino-5-methoxy-benzothiazole-(1,3),
2-amino-6-methoxy-benzothiazole-(1,3),
2-amino-6-ethoxy-benzothiazole-(1,3),
2-amino-5,6-dimethoxy-benzothiazole-(1,3),
2-amino-5-methoxy-6-ethoxy-benzothiazole-(1,3),
2-amino-6-chloro-benzothiazole-(1,3),
2-amino-6-bromo-benzothiazole-(1,3),
2-amino-4-bromo-benzothiazole-(1,3),
2-amino-6-(methylsulphonyl)-benzothiazole-(1,3),
2-amino-6-nitro-benzothiazole-(1,3),
2-amino-thiadiazole-(1,3,4),
2-amino-5-methyl-thiadiazole-(1,3,4),
2-amino-5-phenyl-thiadiazole-(1,3,4),
2-amino-5-nitro-thiadiazole-(1,3,4),
5-amino-3-phenyl-thiadiazole-(1,2,4),
3-amino-5-phenyl-thiadiazole-(1,2,4),
2-amino-4-methyl-5-nitro-thiazole-(1,3),
2-amino-triazole-(1,3,4),
2-amino-benzoxazole-(1,3),
2-aminobenzimidazole-(1,3),
2-aminopyridine,
2-amino-5-nitro-pyridine,
2-amino-3-nitro-pyridine,
2-aminoquinoline,
2-amino-4-methylquinoline,
2-aminopyrimidine and
1-amino-isoquinoline.

Instead of the primary amines, it is sometimes also possible to employ such derivatives as, under the conditions of the reaction, split into the free amines or set these free.

For condensing the amines or amine derivatives with compounds of the Formula II, wherein X means for instances an =O or =S, the following condensing agents are, for example, suitable:

Phosphorus oxychloride, phosphorus trichloride, phosphorus pentachloride, thionyl chloride, sulphuryl chloride, AlCl$_3$, SiCl$_4$ and mixtures of these compounds.

Suitable inert solvents are, for example, 1,2-dichloroethane, chloroform, carbon tetrachloride, acetylene tetrachloride, benzene, toluene, xylene, tetralin, chlorobenzene, di- and trichlorobenzene and nitrobenzene. It is also possible to use an excess of the above-mentioned condensing agents as solvents. Suitable tertiary amines are, for example, triethylamine, tri-n-propylamine, dimethyl-cyclohexylamine, N-methylpiperidine, N-methylmorpholine, pyridine and quinoline.

The condensation of the amines or amine derivatives with compounds of the Formula III, wherein Y stands, for example, for —SR, can be effected, in general, by merely heating the starting components in an organic medium, for example in alcohols.

Suitable compounds of the Formula III are, for example, those of the following composition

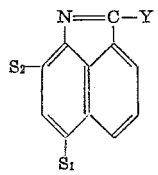

with the following possibilities of substitution:

| Y | $S_1$ | $S_2$ |
|---|---|---|
| —SCH₃ | —H | —H |
| —SCH₃ | —Cl | —H |
| —SCH₃ | —Cl | —Cl |
| —SCH₃ | —Br | —Cl |
| —SCH₃ | —Br | —Br |
| —SCH₃ | —NO₂ | —H |
| —SCH₃ | —OCH₃ | —H |
| —SC₂H₅ | —Cl | —H |
| —SCH₂C₆H₅ | —H | —H |

Instead of these compounds, the salts thereof can also be used.

The novel dyestuffs are suited for the dyeing, printing and dyeing in the mass of fully synthetic and half-synthetic materials, especially of fibre materials of aromatic polyesters, such as polyethylene terephthalates, and those based on terephthalic acid and 1,4-bis-hydroxymethyl-cyclohexane, synthetic polyamides, polyurethanes, polystyrene, acetate rayon and cellulose triacetate. Dyeings and prints on materials which consist wholly or predominantly of aromatic polyesters are distinguished by very good fastness to light, wet processing, sublimation and exhaust gas. Furthermore, the high yield, the excellent affinity and the levelling capacity of the new dyestuffs as well as the very good suitability for the dyeing and printing at temperatures above 100° C. are remarkable.

In the following examples which are given for the purpose of illustrating the invention without, however, restricting it hereto; the parts stand for parts by weight.

Example 1

To a solution of 17 parts of naphtholactam-(1,8) and 15 parts of 2-amino-benzothiazole in 100 parts of chlorobenzene, there are added dropwise at 100–110° C. 17 parts of phosphorus oxychloride and the mixture is stirred for 3 hours at that temperature. After cooling, the suspension formed is poured on to ice-water, neutralised with a dilute sodium hydroxide solution and the chlorobenzene is distilled off with steam. After cooling, the precipitated dyestuff of the formula

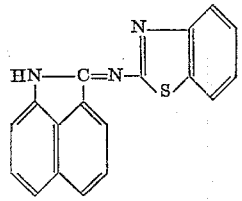

is filtered off with suction and dried. The yield is very good. The new dyestuff gives on aromatic polyester fibres, reddish yellow dyeings and prints of very good fastness to light and wet processing.

If the substituted 2-aminobenzothiazoles specified in the following table are used, similar valuable dyestuffs are obtained by the working method described in this example:

| Amino component | Shade of dyeing of the dyestuff on polyethylene terephthalate fibres |
|---|---|
| 6-methoxy-2-aminobenzothiazole-(1,3) | Reddish yellow. |
| 6-ethoxy-2-aminobenzothiazole-(1,3) | Strong yellowish-orange. |
| 6-methylsulphonyl-2-amino-benzothiazole-(1,3). | Reddish-yellow. |

Example 2

To a solution of 8.5 parts of naphtholactam-(1,8) in 100 parts of chlorobenzene, there are added dropwise at 100–110° C. simultaneously 15.5 parts of phosphorus oxychloride and 10.8 parts of tri-n-propylamine, a suspension of 9 parts of 6-methoxy-2-amino-benzothiazole is then added and the mixture maintained at 100–110° C. for 2 hours. The working up is carried out in analogy to the instructions of Example 1. A dyestuff is obtained, in very good yield, which dyes polyethylene terephthalate fibres in fast reddish yellow shades.

Example 3

To a mixture of 17 parts of naphtholactam-(1,8), 17 parts of 3-phenyl-5-amino-thiodiazole-(1,2,4) and 150 parts of xylene, there are added dropwise at 100–110° C. 14 parts of phosphorus trichloride, the mixture is stirred for 2 hours at 100–110° C. and worked up in accordance with the instructions of Example 1. A dyestuff of the formula

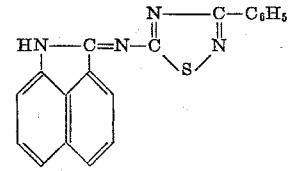

which dyes polyester fibres a strongly reddish yellow colour is obtained in very good yield.

Example 4

To a mixture of 5.1 parts of naphtholactam-(1,8), 5.3 parts of 3-amino-5-phenylthiadiazole-(1,2,4), 100 parts of toluene and 6.5 parts of tri-n-butylamine, there are added dropwise at 100–110° C. 4.7 parts of phosphorus oxychloride and the mixture is stirred for 1½ hours at that temperature. A dyestuff of the formula

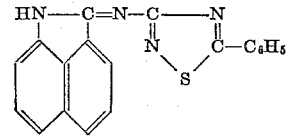

is obtained which dyes polyester materials in a greenish yellow colour.

When working according to the instruction of this example, using the amines specified in the following table, new valuable dyestuffs are likewise obtained:

| Amino component | Shade of dyeing of the dyestuff on polyethylene terephthalate fibres |
|---|---|
| 2-aminotriazole-(1,3,4) | Reddish yellow. |
| 2-nitro-5-amino-thiadiazole-(1,3,4) | Do. |
| 2-methyl-5-amino-thiadiazole-(1,3,4) | Do. |
| 2-amino-4-methyl-5-nitrothiazole-(1,3) | Yellowish orange. |
| 2-amino-4-methyl-quinoline | Reddish yellow. |
| 2-amino-pyrimidine | Do. |

Example 5

To a mixture of 17 parts of naphtholactam-(1,8), 75 parts of chlorobenzene and 10 parts of 2-aminopyridine, there is added dropwise at 90–100° C. a mixture of 12 parts of phosphorus oxychloride and 6 parts of phosphorus trichloride, the suspension is stirred for 3 hours at 90–100° C. and the chlorobenzene subsequently driven off with steam. After cooling, the residue is filtered off with suction, treated with an excess of soda solution for the purpose of conversion into the free base and, if desired, purified by recrystallisation from cyclohexane.

The dyestuff of the formula

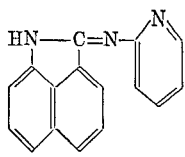

is obtained in the form of yellow crystals. The dyestuff dyes cellulose triacetate and fibres of acetate rayon is strongly greenish yellow shades.

Example 6

14.2 parts of 4-bromo-naphtholactam-(1,8) and 7.0 parts of 2-amino-5-nitropyridine are heated with 225 parts of chlorobenzene to 90° C. 12 parts of phosphorus oxychloride are added dropwise at that temperature, the mixture is stirred for 2 hours at 95–105° C., another 10 parts of phosphorus oxychloride are added dropwise and the suspension is stirred for 2 more hours at 95–105° C. After cooling, the product is filtered off with suction and the filter residue stirred with a solution of sodium acetate. The product thus obtained can be recrystallised from dimethyl formamide. The dyestuff dyes polyethylene terephthalate fibres in fast reddish yellow shades.

Example 7

25.0 parts of 4-bromo-naphtholactam-(1,8), 15.9 parts of 2-aminobenzothiazole-(1,3) and 110 parts of chlorobenzene are heated to 90° C. and 17 parts of phosphorus oxychloride added dropwise, whereby the temperature rises to 104° C. The reaction mixture is stirred for 3 hours at 95–100° C., the chlorobenzene then distilled off with steam and the dyestuff isolated from the cooled reaction mixture. The dyestuff dyes materials of polyethyleneglycol terephthalate from an aqueous dispersion in an outstandingly fast reddish yellow shade.

Example 8

14.3 parts of 4-chloro-naphtholactam-(1,8), 11.1 parts of 2-aminobenzothiazole-(1,3) and 100 parts of chlorobenzene are treated dropwise at 90° C. with 11.5 parts of phosphorus oxychloride, whereby an exothermic reaction occurs. The reaction mixture is stirred for 5 hours at 95–100° C., the chlorobenzene distilled off with steam and the dyestuff isolated from the cooled residue of the steam distillation. The dyestuff dyes materials of polyethyleneglycol terephthalate from an aqueous dispersion in an excellently fast reddish-yellow shade.

Example 9

12.4 parts of 4-bromo-naphtholactam-(1,8), 10.5 parts of 5,6-dimethoxy-2-aminobenzothiazole-(1,3) and 55 parts of chlorobenzene are treated dropwise at 90° C. with 8.0 parts of phosphorus oxychloride. The reaction mixture is then heated to 110° C. and maintained at that temperature for 3 hours. The chlorobenzene is then distilled off with steam, the remaining solution neutralised with 52 parts by volume of a 10% soda solution and the dyestuff isolated after the reaction mixture has cooled down. It dyes materials of polyethyleneglycol terephthalate in yellowish-orange shades with very good fastness properties.

If, instead of 4-bromo-naphtholactam-(1,8), 10.4 parts of 4-chloro-naphtholactam-(1,8) are used and the process is otherwise carried out in the same manner, a dyestuff is obtained which also dyes fabrics of polyethyleneglycol terephthalate yellow-orange with very good fastness properties.

Example 10

10 parts of the compound of the formula

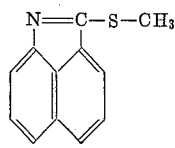

and 9 parts of 2-amino-6-methoxy-benzothiazole are heated with 150 to 200 parts of glacial acetic acid for 60 to 90 minutes at 100–110° C. When the cooled mixture is poured into water, the dyestuff of Example 2 is precipitated. The yield is very good.

If, instead of the methylmercapto compound illustrated by the above formula, the hydroiodide thereof is used in equivalent quantity and ethanol is used instead of glacial acetic acid, the same dyestuff is obtained by the otherwise unchanged working method.

Example 11

A dye bath containing:

0.1 part of the dyestuff obtainable according to Example 7 in dispersed form, 2.0 parts of o-phenylphenol or an equivalent quantity of another dyeing accelerator, for example salicylic acid or cresotic acid ester of a chlorinated benzene hydrocarbon, and 400 parts of water is adjusted with sulphuric acid to a pH value of 4–5. Into this bath, 10 parts of polyethyleneglycol terephthalate fibres are introduced at 30–40° C., the bath is heated to the boil in the course of about 30 minutes, whilst moving about the fibres, and maintained at boiling temperature for one hour. After rinsing and drying a deep reddish yellow dyeing with excellent fastness properties is obtained.

Example 12

0.1 part of the dispersed dyestuff of Example 2 is strewn with thorough stirring into 1–2 parts of water of 40–50° C. After addition of 2–3 parts of one of the dyeing accelerators mentioned in Example 11 the both is diluted with 400 parts of water and adjusted with formic acid to a pH value of 4.5–5.

10 parts of cellulose triacetate fibres are introduced at about 50° C., the temperature is raised in the course of about 20 minutes to at least 98° C. and maintained for 60–90 minutes at 98° C. to boiling temperature. After rinsing and drying a deep reddish yellow dyeing with outstanding fastness properties is obtained.

What we claim is:
1. A dyestuff of the formula

wherein R stands for a member selected from the class consisting of hydrogen, halogen, lower alkyl, lower alkoxy, lower alkylthio, nitro, hydroxyl, ureido, lower alkyl substituted ureido, phenylureido, lower alkylsulphonylamino, lower alkyl phenylsulphonylamino, lower alkylsulphonyl, carbonamide and sulphonamide groups, $n$ stands for an integer ranging from 1 to 2, and stands for a monovalent heterocyclic radical selected from the group consisting of thiazolyl, benzthiazolyl, triazolyl, benzoxazolyl, benzimidazolyl, pyrimidinyl, pyridinyl, quinolinyl, iso-quinolinyl, thiadiazolyl, and any of said heterocyclic radicals substituted 1-2 times with a substituent from the group consisting of chloro, bromo, lower alkyl, lower alkoxy, lower alkylsulphonyl, nitro, and phenyl.

2. A dyestuff of claim 1 wherein

stands for a benzthiazole-(1,3)-yl-2 residue.

3. A dyestuff of claim 1, wherein the residue

contains at least one non-ionic substituent selected from the class consisting of chloro, bromo, lower alkyl, lower alkoxy, lower alkylsulphonyl, nitro and phenyl.

4. A dyestuff of the formula

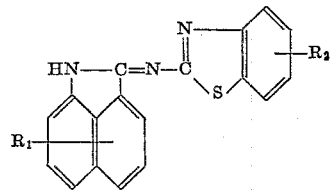

wherein $R_1$ stands for a member selected from the group consisting of hydrogen, chloro and bromo and $R_2$ stands for a member selected from the class consisting of hydrogen, methoxy, ethoxy and methylsulphonyl.

5. The dyestuff of the formula

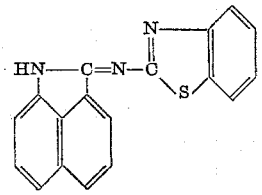

6. The dyestuff of the formula

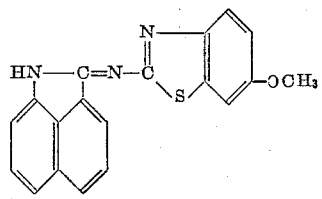

7. The dyestuff of the formula

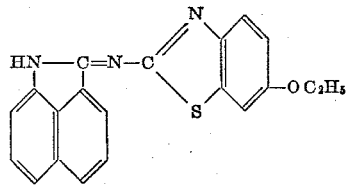

8. The dyestuff of the formula

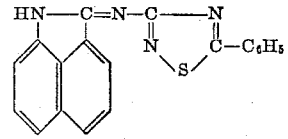

9. The dyestuff of the formula

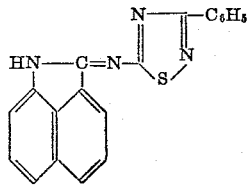

No references cited.

ALEX MAZEL, *Primary Examiner.*

R. J. GALLAGHER, *Assistant Examiner.*